June 17, 1958  W. T. NELSON  2,839,452
DISTILLATION OF HYDROCARBONS WITH ETHYLENE CHLORIDE
Filed Dec. 14, 1954
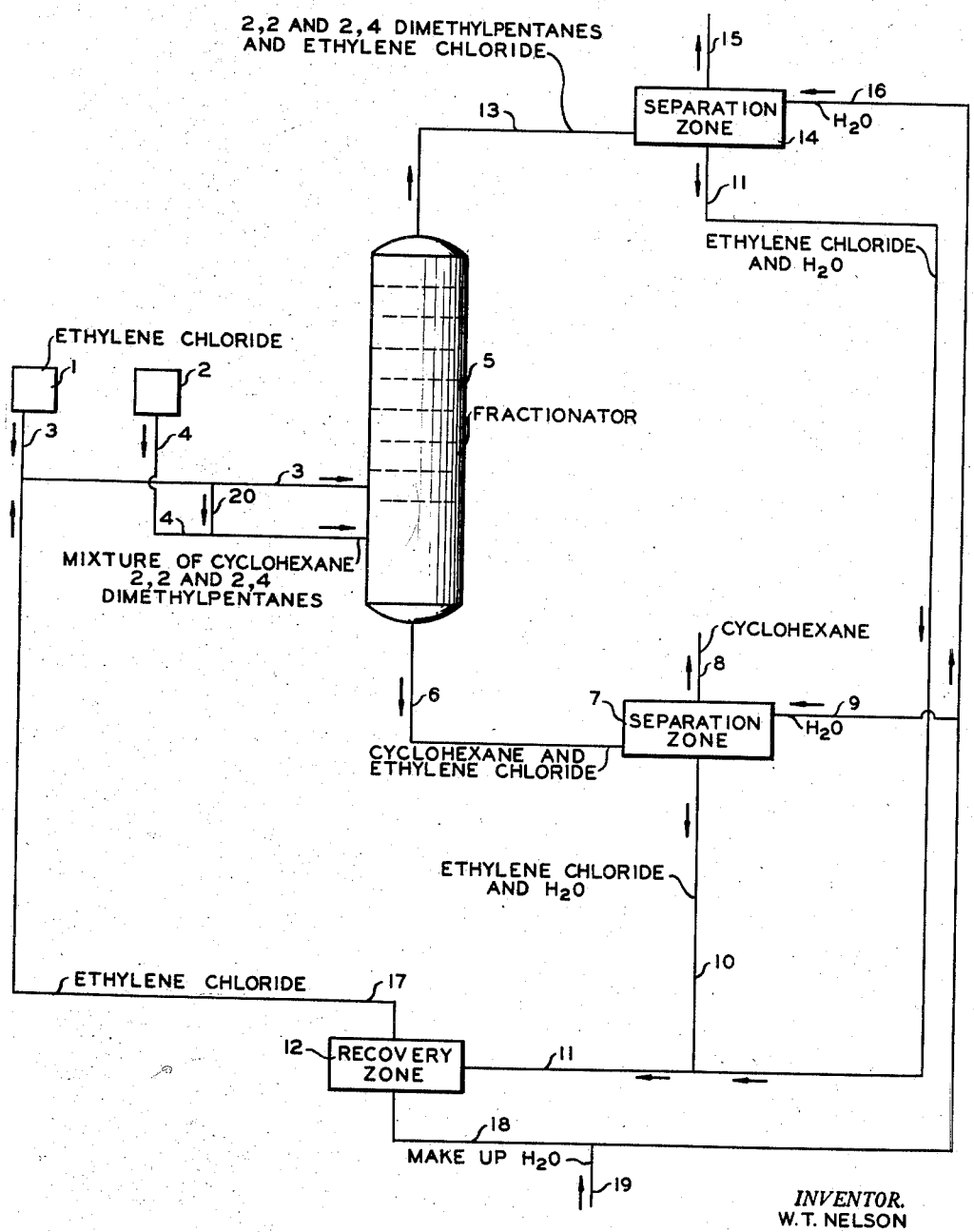
INVENTOR.
W. T. NELSON
BY
Hudson + Young
ATTORNEYS United States Patent Office 2,839,452
Patented June 17, 1958

2,839,452
DISTILLATION OF HYDROCARBONS WITH ETHYLENE CHLORIDE

William T. Nelson, Bartlesville, Okla., assignor to Phillips Petroleum Company, a corporation of Delaware Application December 14, 1954, Serial No. 475,180

10 Claims. (Cl. 202—42)

This invention relates to the separation of close-boiling hydrocarbons by distillation with a low-boiling hydrocarbon halide, e. g., methylene chloride, ethylene chloride. In one of its aspects, the invention relates to the azeotropic distillation of a naphthene and a close-boiling paraffin or isoparaffin hydrocarbon employing one of methylene chloride and ethylene chloride as an entrainer. In another aspect, the invention relates to the separation of aromatics from a close-boiling paraffin or isoparaffin employing one of methylene chloride and ethylene chloride as an entrainer. In a still further aspect, the invention relates to the separation of a cyclo-paraffin from a close-boiling aromatic employing one of methylene chloride and ethylene chloride as an entrainer. In a more specific aspect, the invention relates to the separation of cyclohexane from close-boiling isoparaffins, e. g., 2,2-dimethylpentane and 2,4-dimethylpentane by distilling the same in admixture with ethylene chloride. In another specific aspect, the invention relates to the separation of an aromatic from a close-boiling paraffin, e. g., benzene from 2,2-dimethylpentane and/or 2,4-dimethylpentane employing ethylene chloride as an entrainer. In a still further specific aspect, the invention relates to the separation of an aromatic from a close-boiling naphthene, e. g., benzene from cyclohexane employing ethylene chloride as an entrainer. In a still further specific aspect of the invention it relates to the distillation separation of close-boiling cycloparaffin and aliphatic hydrocarbon, e. g., cyclopentane and neohexane, employing methylene chloride as an entrainer. The same types of separation are possible with methylene chloride as have been set forth herein in connection with ethylene chloride.

In the following table are given boiling points pertinent to the description of the invention:

Table I

| | °C. |
|---|---|
| Ethylene chloride | 83.5 |
| Cyclohexane | 80.74 |
| 2,2-dimethylpentane | 79.21 |
| 2,4-dimethylpentane | 80.51 |
| Methylene chloride | 40.1 |
| Neohexane | 49.74 |
| Benzene | 80.1 |
| Cyclopentane | 49.26 |

One of the most difficult, yet highly desired, separations in the hydrocarbon field at the present time is the separation of high purity cyclohexane from close-boiling hydrocarbons, for example, 2,2- and 2,4-dimethylpentanes. It will be noted from the boiling points given above that ordinary fractional distillation is not suited to the efficient and economical separation of cyclohexane and dimethylpentane admixtures, etc.

It has now been found that ethylene chloride acts as an azeotropic entrainer in a real way and thus considerably facilitates the separation and the recovery of high purity cyclohexane from mixtures containing it and 2,2- and 2,4-dimethylpentanes. Further, ethylene chloride can be used satisfactorily as an entrainer to separate any cycloparaffin from any iso or normal paraffin if the hydrocarbons boil within plus or minus about 30° C. of ethylene chloride. Ethylene chloride forms an azeotrope with 2,4-dimethylpentane and the azetrope has a boiling point of 73.7° C. Ethylene chloride being considerably more soluble in water than the hydrocarbons which ordinarily are substantially insoluble, it has been found that water extraction steps can be effectively employed to remove ethylene chloride from the overhead and kettle products which are obtained.

The invention will now be described with reference to the separation of high purity cyclohexane from 2,2-dimethylpentane and 2,4-dimethylpentane by fractional distillation in the presence of ethylene chloride as an entrainer.

According to this invention, there is provided a method for the separation of a hydrocarbon from another close-boiling hydrocarbon by distillation employing one of methylene chloride and ethylene chloride as an entrainer, for example, for the separation and recovery of cyclohexane from a mixture containing it and 2,2- and/or 2,4-dimethylpentane. Also, according to this invention, ethylene chloride can be used to separate a cycloparaffin from a close-boiling iso and/or normal paraffin provided the latter compounds boil approximately within plus or minus about 30° C. of ethylene chloride. Still further, according to this invention, ethylene chloride can be used for separating aromatics from close-boiling paraffins or for separating cycloparaffins and close-boiling aromatics. Similar separations are possible with methylene chloride.

The proportion of entrainer employed in any given operation or separation can be varied. However, it is preferable to determine in advance upon a representative portion of the mixture the optimum quantity of entrainer required in order to avoid as far as possible the retention of entrainer in the kettle material. This can be accomplished by mere routine testing. However, it is noted that the primary objective of the invention is accomplished when the separation of the hydrocarbons has been made since the separation of the entrainer from the hydrocarbons can then be accomplished either as herein described or otherwise.

In the separation of 2,2- and 2,4-dimethylpentanes from cyclohexane, in order to purify the cyclohexane, it is preferable to use a mixture containing about 95 weight per cent cyclohexane and not more than about 5 weight percent 2,2- and 2,4-dimethylpentanes. It is clear, however, that the separation and the recovery of cyclohexane is facilitated by adding ethylene chloride to mixtures containing cyclohexane and said dimethylpentanes in any proportion.

The separation process is carried out in either a batch or continuous manner in any type distillation column as may be desired. The entrainer can be added to the process at various points in the system or may be premixed with the mixture to be separated, or a combination of such steps may be employed.

In the drawing, there is shown schematically a flow plan of a unit in which ethylene chloride is employed as an entrainer to separate 2,2- and 2,4-dimethylpentanes from cyclohexane and wherein ethylene chloride is recovered, to the extent it is present, from each of the hydrocarbon streams obtained from the distillation.

Referring now to the drawing, ethylene chloride from tank 1 and a mixture, of the two dimethypentanes and cyclohexane to be separated, from tank 2 are passed by way of conduits 3 and 4 respectively into fractional distillation column 5. Cross-over line 20, equipped with a valve, not shown, is employed to introduce directly into the kettle of the column sufficient ethylene chloride to ensure good separation. The remaining ethylene chloride is added as already stated. With this manner of operation, it is possible to more accurately dose the column with ethylene chloride entrainer and to obtain the least amount of ethylene chloride in the bottom product. In the embodiment being described, in which a complete operation, according to the invention, is described, for illustrative purposes, the overhead will contain the two dimethylpentanes and the bottoms will contain cyclohexane of a high order of purity, as high as 98 plus percent and higher. If desired, increased purity can be accomplished by taking overhead a slight amount of cyclohexane. Bottoms from column 5 are removed by way of conduit 6 and passed into cyclohexane separation zone 7 wherein cyclohexane is recovered as a substantially pure product by way of conduit 8 by contacting said bottoms in zone 7 with water introduced by way of conduit 9. Bottoms from zone 7 are removed by way of conduit 10 and passed by way of conduit 11 into ethylene chloride recovery zone 12. Overhead from column 5 is taken off by way of conduit 13 into separation zone 14. From zone 14 there are taken off overhead, by way of conduit 15, hydrocarbons which have been substantially freed of ethylene chloride by contacting the stream entering zone 14 with water which is supplied by way of conduit 16. Ethylene chloride and water are removed from zone 14 by way of conduit 11 and passed to ethylene chloride recovery zone 12 in which ethylene chloride and water are separated, for example, by distillation. Ethylene chloride is returned for reuse by way of conduit 17 and water is returned for reuse by way of conduit 18. Make-up water, if necessary, is introduced by way of conduit 19 into conduit 18.

EXAMPLE I

A blend of 96.2 volume percent of cyclohexane and 3.8 volume percent 2,4-dimethylpentane was distilled using a 40 plate Hypercal distillation column in the presence and absence of ethylene chloride. The data are presented in Table II.

Table II

| Entrainer | Charge, ml. | | Overhead | | Vol. Percent Hydrocarbon Overhead | Purity of Kettle Product, Vol. Percent a |
|---|---|---|---|---|---|---|
| | Blend | Entrainer | Entrainer, Vol. Percent | Temp., °C. b | | |
| None | 50 | 0 | 0 | 80.1 | 21 | 97.0 |
| Ethylene Chloride | 50 | 7 | c 44–47 | 74.4–75.0 | 20 | 98.3 | a Based on freezing point data.
b Corrected to 760 mm. Hg.
c Approximate, since ethylene chloride and the hydrocarbons are miscible at room temperatures.

Data for binary azeotropes are given in Table III.

Table III

| Azeotrope | B. P., °C. a | Vol. Percent Ethylene Chloride |
|---|---|---|
| 2,4-Dimethylpentane-ethylene chloride | 73.7 | 35 |
| Cyclohexane-ethylene chloride | 74.7 | 38 | a Corrected to 760 mm. Hg.

It will be noted that the boiling point spread is one degree centigrade, while the difference between the boiling points of the two pure hydrocarbons is only 0.2 degrees centigrade.

Table IV.—Separation of 2,4-dimethylpentane from benzene with ethylene chloride

| Charge | Normal B. P., °C. | Vol. of Charge, Ml. | Distillate Composition, Vol. Percent | Distillate Temp., °C. |
|---|---|---|---|---|
| 2,4-DMP | 80.5 | 25.0 | 57 | |
| Benzene | 80.1 | 25.0 | 3 | 73.8 corr. to 760 mm. |
| EtCl₂ | 83.5 | 7.0 | 40 | |
| | | 57.0 | | |

13-mm. Hypercal column.

Table V.—Binary data relating to separation of benzene and cyclohexane and to benzene and dimethylpentane

| Component A | Component B | Vol. Percent B in Distillate | Distillate Temp., °C. | Reference |
|---|---|---|---|---|
| 2,4-DMP | EtCl₂ | 35 | 73.7 | By applicant. |
| 2,4-DMP | Benzene | 42 | 75.2 | Horsley.[1] |
| Benzene | EtCl₂ | 15 | 80.1 | By applicant. |
| Cyclohexane | Benzene | 49 | 77.7 | Horsley.[1] |
| Cyclohexane | EtCl₂ | 38 | 74.4 | By applicant. |

[1] Horsley et al.—Azeotropic Data—Advances in Chemistry Series #6—page 45.

It is noted that there is a 3.0° C. B. P. spread between the cyclohexane-EtCl₂ and cyclohexane-benzene azeotropes (last two lines of Table V).

Table VI.—Distillation of cyclopentane-neohexane with ethylene chloride

| Charge | Normal B. P., °C. | Charge Vol., Ml. | Distillate Composition, Vol. Percent | Distillate Temp., °C. |
|---|---|---|---|---|
| Cyclopentane | 49.3 | 25 | 55 | |
| Neohexane | 49.7 | 25 | 45 | 48.9° C. Corr. to 760 mm. |
| EtCl₂ | 83.5 | 7 | 0 | |
| | | 57 | 100 | |
| (Marschner & Burney, Ind. & Eng. Chem. 44, 1406 (1952)) | | | | |
| Binary Azeotrope: | | | | |
| Cyclopentane | | | 80 | 49.1° C. |
| Neohexane | | | 20 | |

13-mm. Hypercal column.

As noted, methylene chloride is effective to aid in the separation of neohexane and cyclopentane mixtures. The following table is pertinent to this separation and shows that the difference of 0.48° C. between the boiling points of neohexane and cyclopentane is spread to 1° C. when their azeotropes with methylene chloride are distilled.

Table VII

| Hydrocarbon | B. P., °C. | B. P. of Azeotrope | Vol. Percent MeCl² in Azeotrope |
|---|---|---|---|
| Neohexane | 49.74 | a 35.6 | 53 |
| Cyclopentane | 49.26 | a 36.6 | 60 |
| | .48 | 1.0 | | a At 742 mm. Hg.

Reasonable variation and modification are possible within the scope of the foregoing disclosure, drawing, and the appended claims to the invention, the essence of which is that hydrocarbon dichlorides, as described, for example methylene chloride, and ethylene chloride which has its chlorine atoms attached to different carbon atoms, have been found to be entrainers for the separation of close-boiling hydrocarbons, as described, for example, for the separation of cyclohexane from 2,2- and/or 2,4-dimethylpentanes; benzene from 2,4-dimethylpentane; benzene from cyclohexane, neohexane from cyclopentane, as described; and that, therefore, there has been provided a method for the separation of close-boiling, yet different types of hydrocarbons, also as described.

I claim:

1. The separation of a cycloparaffin from its admixture with at least one compound selected from the group consisting of a close-boiling normal paraffin and isoparaffin which comprises adding to said admixture at least one compound selected from the group consisting of methylene chloride and ethylene chloride and distilling said admixture, said compound boiling within 30° C. of said chloride, thereby distilling overhead an azeotrope of the selected chloride with the selected paraffin and leaving at least the major portion of the said cycloparaffin undistilled.

2. The separation of an aromatic from at least one compound selected from the group consisting of a close-boiling paraffin and isoparaffin which comprises adding to said admixture ethylene chloride and distilling said admixture, said compound boiling within 30° C. of said chloride.

3. The distillation separation of cyclohexane from a mixture of it and at least one compound selected from the group consisting of 2,2- and 2,4-dimethylpentanes which comprises employing ethylene chloride as an entrainer in said distillation, thereby distilling overhead an azeotrope of the selected dimethylpentane with ethylene chloride and leaving at least a major portion of the cyclohexane undistilled.

4. The distillation separation of benzene from a mixture of it and 2,4-dimethylpentane which comprises adding to said admixture ethylene chloride and distilling said admixture.

5. The distillation separation of neohexane and cyclopentane which comprises effecting said separation employing methylene chloride as an entrainer.

6. The distillation separation of a mixture of hydrocarbons comprising a mixture containing about 95 weight percent or more cyclohexane and not more than about 5 weight percent of 2,2- and 2,4-dimethylpentanes which comprises distilling said mixture in the presence of ethylene chloride as an azeotropic entrainer in said distillation for said dimethylpentanes and distilling overhead the azeotropes of said dimethylpentanes with ethylene chloride while leaving at least a major portion of the cyclohexane undistilled.

7. The distillation separation of a paraffin from another close-boiling hydrocarbon in a mixture of hydrocarbons comprising a mixture of a paraffin in a mixture containing at least one close-boiling compound selected from the group consisting of an aromatic hydrocarbon and a cycloparaffin which comprises distilling said hydrocarbons in the presence of at least one compound selected from the group consisting of methylene chloride and ethylene chloride and distilling overhead an azeotrope of said selected chloride containing said paraffin, said paraffin boiling within 30° C. of said chloride.

8. The separation of a cycloparaffin from its admixture with at least one compound selected from the group consisting of a close-boiling normal paraffin and isoparaffin which comprises adding to said admixture at least one compound selected from the group consisting of methylene chloride and ethylene chloride in an amount such that the resulting admixture contains said selected chloride in an amount at least equivalent to its azeotrope composition with said selected paraffin, and distilling said admixture, thereby distilling overhead an azeotrope of the selected chloride with substantially all of the selected paraffin and leaving at least the major portion of said cycloparaffin undistilled, said paraffin compound boiling within 30° C. of said chloride.

9. The separation of an aromatic from at least one compound selected from the group consisting of a close-boiling paraffin and isoparaffin which comprises adding to said admixture ethylene chloride in an amount such that the resulting admixture contains at least as much ethylene chloride as is equivalent to its azeotropic composition with said selected paraffin and distilling said admixture, thereby distilling overhead an azeotrope of ethylene chloride with substantially all of said selected paraffin and leaving at least the major portion of said cycloparaffin undistilled, said compound boiling within 30° C. of said ethylene chloride.

10. The distillation separation of a paraffin from another close-boiling hydrocarbon in a mixture of hydrocarbons comprising a mixture of a paraffin in a mixture containing at least one close-boiling compound selected from the group consisting of an aromatic hydrocarbon and a cycloparaffin which comprises distilling said hydrocarbons in the presence of at least one compound selected from the group consisting of methylene chloride and ethylene chloride, the selected chloride being present in an amount equivalent to the azeotrope composition of said paraffin in said mixture and distilling overhead an azeotrope of said selected chloride containing substantially all of said paraffin in said mixture, said paraffin boiling within 30° C. of said chloride.

References Cited in the file of this patent

UNITED STATES PATENTS

| 1,948,777 | Young et al. | Feb. 27, 1934 |
| 2,050,513 | Van Peski et al. | Aug. 11, 1936 |
| 2,341,433 | Fisher | Feb. 8, 1944 |
| 2,366,361 | Semon et al. | Jan. 2, 1945 |
| 2,467,152 | Ohsol et al. | Apr. 12, 1949 |
| 2,540,318 | Birch et al. | Feb. 6, 1951 |
| 2,692,227 | Cines | Oct. 19, 1954 |

OTHER REFERENCES

"Azeotropic distillation" (Ewell et al.); Ind. & Eng. Chem., October 1944; vol. 36, No. 10; pp. 871-875.

"Azeotropic data" (Horsley et al.), 1952, page 45.

"Composition and B. P. of binary azeotropes" (Meissner et al.); Ind. & Eng. Chem.; March 1948; vol. 40, No. 3, pp. 438-450.